United States Patent
Thangavel et al.

(10) Patent No.: US 11,621,907 B2
(45) Date of Patent: Apr. 4, 2023

(54) ENHANCED TWO-WAY ACTIVE MEASUREMENT PROTOCOL

(71) Applicant: Juniper Networks, Inc., Sunnyvale, CA (US)

(72) Inventors: Mohan Thangavel, Bangalore (IN); Elango Krishnasami, Bangalore (IN); Thyagarajan S. Pasupathy, Bangalore (IN); Radhakrishnan G, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 175 days.

(21) Appl. No.: 16/947,569

(22) Filed: Aug. 6, 2020

(65) Prior Publication Data

US 2020/0382404 A1    Dec. 3, 2020

Related U.S. Application Data

(63) Continuation of application No. 16/428,673, filed on May 31, 2019, now Pat. No. 10,749,785.

(51) Int. Cl.
*H04L 12/26* (2006.01)
*H04L 12/24* (2006.01)
(Continued)

(52) U.S. Cl.
CPC .......... *H04L 43/50* (2013.01); *H04L 41/5009* (2013.01); *H04L 43/0817* (2013.01); *H04L 69/326* (2013.01)

(58) Field of Classification Search
CPC . H04L 43/50; H04L 41/5009; H04L 43/0817; H04L 69/326; H04L 41/00;
(Continued)

(56) References Cited

U.S. PATENT DOCUMENTS 10,749,785 B1    8/2020 Thangavel et al.
2016/0191367 A1* 6/2016 Mirsky ................... H04L 69/24
                                                        709/203
(Continued)

FOREIGN PATENT DOCUMENTS

CN    104221326 A    12/2014
CN    106209413 A    12/2016
(Continued)

OTHER PUBLICATIONS

Communication pursuant to Article 94(3) EPC from counterpart European Application No. 19181457.3 dated Jan. 12, 2022, 8 pp.
(Continued)

*Primary Examiner* — Boris D Grijalva Lobos
(74) *Attorney, Agent, or Firm* — Shumaker & Sieffert, P.A.

(57) ABSTRACT

Techniques are described for an enhanced two-way active measurement protocol (TWAMP) to measure network performance of links and/or network paths in a fully converged Software Defined Wide Area Network (SD-WAN), using a single TWAMP instance. In one example, a first network device executing a TWAMP session-sender may send a test packet embedded with one or more metrics to the TWAMP session-reflector executed by another network device, which reflects the test packet embedded with one or more metrics back to the TWAMP session-sender. The TWAMP session-sender may further reflect a test packet embedded with one or more additional metrics back to a TWAMP session-reflector to enable the network devices to independently perform network performance calculations using the metrics embedded within the test packets exchanged in a single TWAMP instance.

20 Claims, 8 Drawing Sheets

(51) Int. Cl.
*H04L 29/08* (2006.01)
*H04L 43/50* (2022.01)
*H04L 41/5009* (2022.01)
*H04L 43/0817* (2022.01)
*H04L 69/326* (2022.01)

(58) Field of Classification Search
CPC ....... H04L 41/04; H04L 41/046; H04L 41/06; H04L 41/065; H04L 41/0677; H04L 41/0668; H04L 41/0686; H04L 41/08; H04L 41/12; H04L 41/14; H04L 43/00; H04L 43/08; H04L 43/0852; H04L 43/0864; H04L 43/10
See application file for complete search history.

(56) References Cited

U.S. PATENT DOCUMENTS

| | | | |
|---|---|---|---|
| 2016/0352866 A1* | 12/2016 | Gupta | H04L 43/0864 |
| 2017/0019323 A1* | 1/2017 | Allan | H04L 45/24 |
| 2018/0091603 A1* | 3/2018 | Sarangapani | H04L 43/0864 |
| 2018/0167294 A1 | 6/2018 | Gupta et al. | |
| 2019/0280914 A1* | 9/2019 | Menon | H04L 47/283 |
| 2019/0296997 A1* | 9/2019 | Menon | H04L 41/5009 |
| 2020/0007427 A1* | 1/2020 | Kumar | H04L 67/142 |

FOREIGN PATENT DOCUMENTS

| | | |
|---|---|---|
| CN | 108234235 A | 6/2018 |
| EP | 2834940 A1 | 2/2015 |
| WO | 2013151471 A1 | 10/2013 |
| WO | 2013/184846 A1 | 12/2013 |
| WO | 2017114568 A1 | 7/2017 |

OTHER PUBLICATIONS

Second Office Action and Search Report, and translation thereof, from counterpart Chinese Application No. 201910912332.X dated Sep. 2, 2021, 7 pp.
Examination Report from counterpart European Application No. 19181457.3, dated Jun. 28, 2021, 7 pp.
Extended Search Report from counterpart European Application No. 19181457.3, dated Oct. 18, 2019, 9 pp.
First Office Action and Search Report, and translation thereof, from counterpart Chinese Application No. 201910912332.X, dated Mar. 3, 2021, 13 pp.
Response to Extended Search Report dated Oct. 18, 2019 from counterpart European Application No. 19181457.3, filed Jun. 2, 2021, 23 pp.
Hedayat et al., "A Two-Way Active Measurement Protocol (TWAMP)," Network Working Group, RFC 5357, Oct. 2008, 26 pp.
U.S. Appl. No. 16/428,673, filed May 31, 2019, Juniper Networks, Inc. (inventor: Thangavel et al.) entitled "Enhanced Two-Way Active Measurement Protocol".
Notice of Allowance from U.S. Appl. No. 16/428,673, dated Apr. 15, 2020, 16 pp.
Communication pursuant to Article 94(3) EPC from counterpart European Application No. 19181457.3 dated May 19, 2022, 8 pp.
Response to Communication pursuant to Article 94(3) EPC dated May 19, 2022, from counterpart European Application No. 19181457.3 filed Sep. 13, 2022, 19 pp.
Communication pursuant to Article 94(3) EPC from counterpart European Application No. 19181457.3 dated Sep. 27, 2022, 4 pp.
Response to Communication pursuant to Article 94(3) EPC dated Sep. 27, 2022, from counterpart European Application No. 19181457.3 filed Jan. 5, 2023, 20 pp.

* cited by examiner

ENHANCED TWO-WAY ACTIVE MEASUREMENT PROTOCOL

This application is a continuation application of U.S. application Ser. No. 16/428,673 filed May 31, 2019, the entire content of each of which is incorporated by reference herein.

TECHNICAL FIELD

The disclosure relates to computer networks.

BACKGROUND

A computer network is a collection of interconnected computing devices that can exchange data and share resources. A One-Way Active Measurement Protocol (OWAMP) may be used to measure one-way metrics of network performance between two network devices. OWAMP can be used bi-directionally to measure one-way metrics in both directions between the two network devices, but OWAMP does not accommodate two-way or round-trip measurements. A Two-Way Active Measurement Protocol (TWAMP) is based on OWAMP and adds the ability to measure two-way or round-trip metrics of network performance between the two network devices. For example, TWAMP may be used to measure both two-way and one-way network performance indicators, such as latency, delay (inter frame gap), jitter, packet loss, throughput, and the like (referred to as "service level agreement (SLA) metrics").

A TWAMP measurement architecture includes at least two network devices, also referred to as hosts or endpoints, that each support TWAMP and perform specific roles to start test sessions and exchange test packets over the test sessions. TWAMP control messaging, used to initiate, start, and stop test sessions, occurs between a TWAMP control-client and a TWAMP server. TWAMP data or test messaging, used to exchange test packets in order to measure network performance, occurs between a TWAMP session-sender and a TWAMP session-reflector. In an example network architecture, the logical roles of the TWAMP control-client and the TWAMP session-sender may both be executed by a first endpoint, and the logical roles of the TWAMP server and the TWAMP session-reflector may both be executed by a second endpoint. In other example architectures, each of the logical roles may be executed on a different host.

SUMMARY

In general, the disclosure describes techniques for an enhanced Two-Way Active Measurement Protocol (TWAMP) to measure network performance of links and/or network paths in a fully converged Software Defined Wide Area Network (SD-WAN), using a single TWAMP instance. The disclosed techniques include extending TWAMP to enable network devices of the fully converged SD-WAN that support the enhanced TWAMP to each perform dual roles during a single instance of the TWAMP. For example, a first network device may be configured to execute a TWAMP control-client and a TWAMP session-sender (referred to as "TWAMP controller" or "TWAMP client"), while a second network device may be configured to execute a TWAMP server and a TWAMP session-reflector (referred to as "TWAMP responder" or "TWAMP server"). The controller-responder pair of network devices may act as a responder-controller, simultaneously, during the same TWAMP instance.

In one implementation, the first network device executing a TWAMP session-sender may send a test packet embedded with one or more metrics to the TWAMP session-reflector executed by another network device, which reflects the test packet embedded with one or more metrics back to the TWAMP session-sender. The TWAMP session-sender may further reflect a test packet embedded with one or more additional metrics back to a TWAMP session-reflector to enable the network devices to independently perform network performance calculations using the metrics embedded within the test packets exchanged in a single TWAMP instance.

The disclosed techniques further include extending TWAMP to enable the network devices to share network performance calculations. For example, the TWAMP session-sender may, in response to receiving the test packet reflected from the TWAMP session-reflector, calculate the network performance measurements and share the calculated network performance measurements to the TWAMP session-reflector such that the network device that executes the TWAMP session-reflector may obtain the calculated network performance measurements without having to establish a second TWAMP instance to measure network performance. Moreover, the disclosed techniques further include extending TWAMP to enable the network devices to send delta compute times—such as the time from when the network device receives a test packet to the time when the network device sends the test packet—rather than sending a test packet embedded with a received timestamp and a responder timestamp.

The techniques described may provide one or more technical advantages that provide at least one practical application. For example, by implementing the enhanced TWAMP, network devices of a fully converged SD-WAN may improve SD-WAN application SLA identification and best link election. For example, by implementing the enhanced TWAMP, network devices may independently perform round-trip network performance calculations during a single instance of TWAMP, which reduces the number of TWAMP instances needed to calculate round-trip network performance at each end of the SD-WAN. The reduction of the number of TWAMP instances reduces the number of control session packets and test session packets that are exchanged (e.g., by 50%), thereby reducing bandwidth consumption and computation overhead of computing devices using TWAMP to determine which links and/or network paths comply with SLA requirements to forward network traffic. Moreover, by sending a delta compute time ($\Delta T$) rather than a received timestamp and responder timestamp, fewer bytes (e.g., 6 bytes) are needed when exchanging test packets, thereby reducing the amount of computer resources and processing needed to execute a TWAMP instance. Additionally, by electing the network device having more robust system resources available to execute the TWAMP control-client, the performance of the enhanced TWAMP can be dynamically offloaded to the network device with the more robust system resources. This may be useful, for example, in situations of compute resource crisis.

In one example, a method includes establishing, by a first network device executing a Two-Way Active Measurement Protocol (TWAMP) control-client, a control connection between the TWAMP control-client and a TWAMP server executed on a second network device, wherein the control connection is used to negotiate a test session between a TWAMP session-sender executed on the first network device and a TWAMP session-reflector executed on the second network device. The method also includes sending, by the TWAMP session-sender executed on the first network device, one or more TWAMP test packets for the test session to the TWAMP session-reflector, each of the one or more TWAMP test packets including a first metric embedded within the one or more TWAMP test packets. The method further includes receiving, by the TWAMP session-sender executed on the first network device, the one or more TWAMP test packets back from the TWAMP session-reflector, each of the one or more TWAMP test packets including a second metric embedded within the one or more TWAMP test packets. Additionally, the method includes sending, by the TWAMP session-sender executed on the first network device and during the test session, the one or more TWAMP test packets back to the TWAMP session-reflector to cause the second network device to calculate at least one active round-trip network performance metric for a link between the first network device and the second network device, each of the one or more TWAMP test packets including a third metric embedded within the one or more TWAMP test packets.

In another example, a method includes establishing, by a first network device executing a Two-Way Active Measurement Protocol (TWAMP) server, a control connection between the TWAMP server and a TWAMP control-client executed on a second network device, wherein the control connection is used to negotiate a test session between a TWAMP session-reflector executed by the first network device and a TWAMP session-sender executed by the second network device. The method also includes receiving, by the TWAMP session-reflector executed on the first network device, one or more TWAMP test packets for the test session from the TWAMP session-sender, each of the one or more TWAMP test packets including a first metric embedded within the one or more TWAMP test packets. The method further includes sending, by the TWAMP session-reflector executed on the first network device, the one or more TWAMP test packets back to the TWAMP session-sender, each of the one or more TWAMP test packets including a second metric embedded within the one or more TWAMP test packets. Additionally, the method includes receiving, by the TWAMP session-reflector executed on the first network device and during the test session, the one or more TWAMP test packets back from the TWAMP session-sender, each of the one or more TWAMP test packets including a third metric embedded within the one or more TWAMP test packets. The method also includes calculating, by the first network device, at least one active round-trip network performance metric for a link between the first network device and the second network device.

In yet another example, a first network device includes a memory. The first network device includes one or more processors in communication with the memory and executing a two-way active measurement protocol (TWAMP) control-client and a TWAMP session-sender, the one or more processors configured to establish a control connection between the TWAMP control-client and a TWAMP server executed by a second network device, wherein the control connection is used to negotiate a test session between the TWAMP session-sender executed on the first network device and a TWAMP session-reflector executed on the second network device. The one or more processors are also configured to send one or more TWAMP test packets for the test session to the TWAMP session-reflector, each of the one or more TWAMP test packets including a first metric embedded within the one or more TWAMP test packets. The one or more processors are further configured to receive the one or more TWAMP test packets back from the TWAMP session-reflector, each of the one or more TWAMP test packets including a second metric embedded within the one or more TWAMP test packets. The one or more processors are also configured to send, during the test session, the one or more TWAMP test packets back to the TWAMP session-reflector to cause the second network device to calculate at least one active round-trip network performance metric for a link between the first network device and the second network device, each of the one or more TWAMP test packets including a third metric embedded within the one or more TWAMP test packets.

In yet another example, a first network device includes a memory. The first network device includes one or more processors in communication with the memory and executing a two-way active measurement protocol (TWAMP) server and a TWAMP session-reflector, the one or more processors configured to establish a control connection between the TWAMP server and a TWAMP control-client executed by a second network device, wherein the control connection is used to negotiate a test session between a TWAMP session-reflector executed by the first network device and a TWAMP session-sender executed by the second network device. The one or more processors are also configured to receive one or more TWAMP test packets for the test session from the TWAMP session-sender, each of the one or more TWAMP test packets including a first metric embedded within the one or more TWAMP test packets. The one or more processors are further configured to send the one or more TWAMP test packets back to the TWAMP session-sender, each of the one or more TWAMP test packets including a second metric embedded within the one or more TWAMP test packets. Moreover, the one or more processors are configured to receive, during the test session, the one or more TWAMP test packets back from the TWAMP session-sender, each of the one or more TWAMP test packets including a third metric embedded within the one or more TWAMP test packets. The one or more processors are also configured to calculate at least one active round-trip network performance metric for a link between the first network device and the second network device.

In yet another example, a system includes a first network device executing a Two-Way Active Measurement Protocol (TWAMP) control-client and a TWAMP session-sender for a test session. The system also includes a second network device executing a TWAMP server and a TWAMP session-reflector for the test session. The TWAMP session-sender is configured to exchange one or more TWAMP test packets for the test session between the TWAMP session-sender and the TWAMP session-reflector, wherein, to exchange the one or more TWAMP test packets for the test session, the TWAMP session-sender is configured to send, during the test session, the one or more TWAMP test packets received from the TWAMP session-reflector back to the TWAMP session-reflector; and calculate at least one active round-trip network performance metric for a link between the first network device and the second network device. The TWAMP session-reflector is configured to exchange the one or more TWAMP test packets for the test session between the TWAMP session-reflector and the TWAMP session-sender, wherein, to exchange the one or more TWAMP test packets for the test session, the TWAMP session-reflector is configured to receive the one or more TWAMP test packets back from the TWAMP session-sender; and calculate at least one active round-trip network performance metric for the link between the first network device and the second network device.

The details of one or more examples are set forth in the accompanying drawings and the description below. Other features, objects, and advantages will be apparent from the description and drawings, and from the claims.

DETAILED DESCRIPTION

Figure 1:
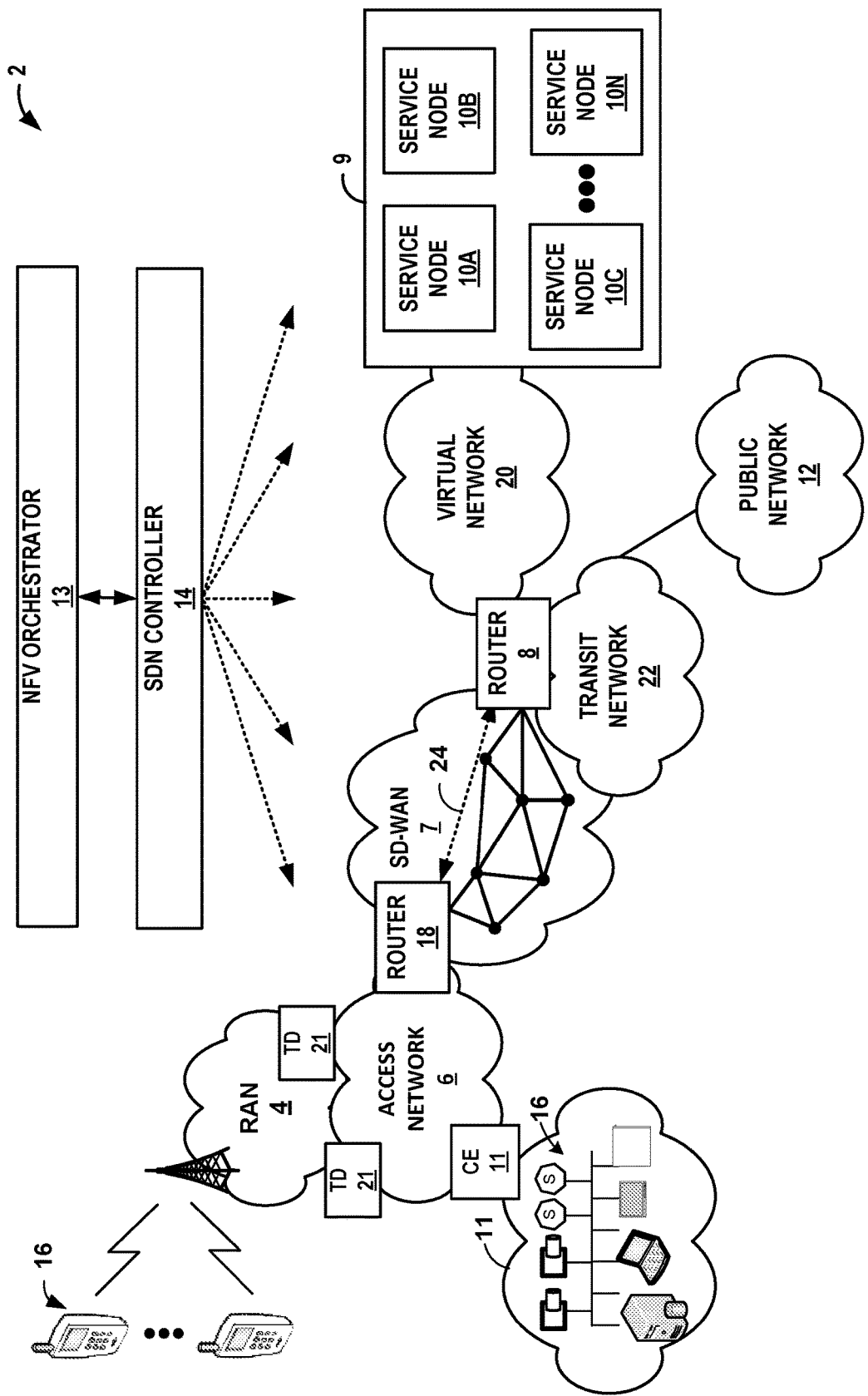
FIG. 1 is a block diagram illustrating an example network system that provides an enhanced Two-Way Active Measurement Protocol (TWAMP) to measure network performance of links and/or network paths of a fully converged SD-WAN, in accordance with one or more aspects of the techniques described in this disclosure.

FIG. 1 is a block diagram illustrating an example network system that provides an enhanced Two-Way Active Measurement Protocol (TWAMP) to measure network performance of a fully converged SD-WAN, in accordance with one or more aspects of the techniques described in this disclosure. The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by subscriber devices 16. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 6. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

Router 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. SD-WAN 7 may include different WAN links, such as a WAN link coupling router 18 to an MPLS network, a WAN link coupling router 18 to the Internet, a WAN link coupling router 18 to a long-term evolution (LTE) network, or any other link of any suitable type for transmitting data flows between the subscriber services. SD-WAN 7 may comprise a plurality of network devices that form a fully converged (i.e., full mesh) network. For example, a full mesh SD-WAN network is a type of deployment in which all the SD-WAN aware nodes are interconnected to each other in internet/intranet via multiple links directly or using overlay to each other. That is, in a full mesh network, each of the plurality of network devices is connected to one another. Because each of the plurality of network devices of SD-WAN 7 are connected to one another, the path from router 18 to router 8 is the same as the path from router 8 to router 18.

Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMIS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to access network 6, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as router 18 or router 8. In turn, router 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, router 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

As described herein, service provider network 2 includes a data center 9 having a cluster of service nodes 10 that provide an execution environment for the mostly virtualized network services. In some examples, each of service nodes 10 represents a service instance. Each of service nodes 10 may apply one or more services. As examples, service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

Router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." In the example of FIG. 1, subscriber packet flows may be directed along a service chain that includes any of service nodes 10. A particular service node 10 may support multiple service chains. Once processed at a terminal node of the service chain, i.e., the last service node 10 to apply services to packets flowing along a particular service path, the terminal node may direct the traffic back to router 8 for further processing and/or forwarding to public network 12. For example, traffic engineered service paths may start and terminate with router 8.

In the example of FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain. Further example details of an SDN controller are described in PCT International Patent Application PCT/U.S. Ser. No. 13/44,378, filed Jun. 5, 2013, the entire content of which is incorporated herein by reference.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnel such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

Users may expect applications and services to be provided by a service provider with an acceptable level of quality, commonly referred to as Quality of Experience (QoE). The QoE may be measured based on various metrics, including latency, delay (inter frame gap), jitter, packet loss, throughput, and the like. The users may define desired levels for one or more of the metrics for the QoE that the users expect in service contracts, e.g., service level agreements (SLAs), with the service provider.

Service provider network 2 provides Two-Way Active Measurement Protocol (TWAMP) to measure both one-way and two-way or round trip metrics of network performance, such as the SLA metrics, between network devices, also referred to as hosts or endpoints. Network devices may use TWAMP to perform application SLA identification and/or best link election. That is, network devices may use TWAMP to determine the network performance for application traffic on links and/or network paths between the network devices, and/or select the links and/or network paths that best satisfy the SLA parameters to forward network traffic from an application. In general, a TWAMP measurement architecture includes at least two network devices that each support TWAMP and perform specific roles to exchange control session packets (or simply "control packets") to set up and start TWAMP test sessions and exchange test session packets (or simply "test packets") for TWAMP test sessions. In the example of FIG. 1, TWAMP may be used to measure network performance (e.g., WAN link performance) between router 18 and router 8. In this example, router 18 may be configured to execute a TWAMP control-client and a TWAMP session-sender (referred to as a "TWAMP controller" or "TWAMP client"), while router 8 may be configured to execute a TWAMP server and a TWAMP session-reflector (referred to as a "TWAMP responder" or "TWAMP server"). In alternative TWAMP architectures, each of the logical roles may be executed on a different host or endpoint.

The TWAMP control-client executed on router 18 and the TWAMP server executed on router 8 establish a control connection and exchange TWAMP control packets to initiate, start, and stop TWAMP test session 24. Once TWAMP test session 24 is established, the TWAMP session-sender executed on router 18 and the TWAMP session-reflector executed on router 8 exchange TWAMP test packets for test session 24 that carry one or more metrics used to measure network performance between router 18 and router 8. Although only one test session 24 is illustrated in the example of FIG. 1, in other examples, multiple test sessions may be established between the two TWAMP enabled endpoints. In some examples, each of the multiple test sessions may be associated with a different network performance metric.

In some examples, the metrics carried by TWAMP test packets may include one or more of timestamps for sending or receiving a test packet, error estimates for sending or receiving the test packet, a keepalive packet data unit (PDU), and/or a count of packets, bytes, or subscribers. The one-way and two-way network performance measurements may include keepalive or path connectivity, round-trip time (RTT), path delay, packet jitter, packet re-ordering, packet loss, latency measurements, or load measurements based on the received metrics. Additional examples of TWAMP are described in more detail in Hedayat, et al., "A Two-Way Active Measurement Protocol (TWAMP)," Internet Engineering Task Force (IETF), Network Working Group, Request for Comments 5357, October 2008, the entire contents of which is incorporated by reference herein.

In some instances, to measure round-trip network performance at both endpoints, multiple TWAMP instances are implemented. For example, to measure network performance at a first network device, the first network device may be configured in a first TWAMP instance to execute a TWAMP controller (e.g., TWAMP control-client and a TWAMP session-sender) while the second network device may be configured to execute a TWAMP responder (e.g., TWAMP server and a TWAMP session-reflector). The first network device may measure network performance based on metrics carried by TWAMP test packets exchanged in the first TWAMP instance. To measure the performance at a second network device, the second network device may be configured in a second TWAMP instance to execute a TWAMP controller, while the first network device is configured to execute a TWAMP responder. If the network devices are in a fully converged network, the path from the first network device to the second network device is the same as the path from the second network device to the first network device. In this case, the implementation of multiple TWAMP instances to measure the network performance at each of the network devices wastes bandwidth and computational resources. For example, to measure network performance for each of the TWAMP instances, each of the TWAMP instances requires the exchange of TWAMP control packets and TWAMP test packets. For an SD-WAN full mesh network with "N" number of nodes, an "X" number of applications per node, and a "Y" number of links between each of the nodes at one end, this results in running X*(N−1)*Y number of test packets at every SD-WAN node in the full mesh network. For instance, each TWAMP instance may exchange 12 control packets and 2 test packets. In such example, for each TWAMP instance, 14 packets are exchanged.

In accordance with the techniques described herein, service provider network 2 may provide enhanced TWAMP to measure network performance of a fully converged SD-WAN 7 with test packets exchanged during a single TWAMP instance. In the example illustrated in FIG. 1, network devices of the fully converged SD-WAN 7, e.g., routers 8 and 18, may support the enhanced TWAMP as described herein and may run a single instance of a TWAMP control and test session to measure network performance of links and/or network paths of SD-WAN 7.

As one example, router 8 and router 18 that support enhanced TWAMP may each execute dual roles as a TWAMP controller and as a TWAMP responder. For example, router 8 and router 18 may act as a controller-responder pair, respectively, and may also act as a responder-controller pair, simultaneously. Routers 8 and 18 may elect a master device to execute a TWAMP control-client, and non-elected device(s) operate as a secondary device to execute a TWAMP server. As further described herein, one of routers 8 and 18 is elected to execute the master TWAMP control-client based the network device that has a more robust system resource usage (e.g., hardware capabilities) or load. In the example of FIG. 1, the logical role of a TWAMP control-client is executed by router 18 and the logical role of a TWAMP server is executed by router 8. As further described herein, router 18 may execute a TWAMP control-client to set up, start, and stop TWAMP test session 24. For example, TWAMP control-client executed by router 18 may establish a control connection with the TWAMP server executed by router 8. The TWAMP control-client and TWAMP server exchange control packets over the control connection to negotiate TWAMP test session 24.

Router 18 may also execute a TWAMP session-sender and router 8 may execute a TWAMP session-reflector for TWAMP test session 24. In such example, router 18 may operate as a TWAMP controller and router 8 may operate as a TWAMP responder. When the TWAMP test session 24 is set up, the TWAMP session-sender executed by router 18 may create and send test packets to a TWAMP session-reflector executed by router 8, which reflects the test packet back to the TWAMP session-sender executed by router 18. As the test packet is exchanged between the TWAMP session-sender and the TWAMP session-reflector, the TWAMP session-sender and TWAMP session-reflector may embed respective metrics (e.g., timestamps) to indicate the transmission time, received time, and/or responder time.

Figure 2:
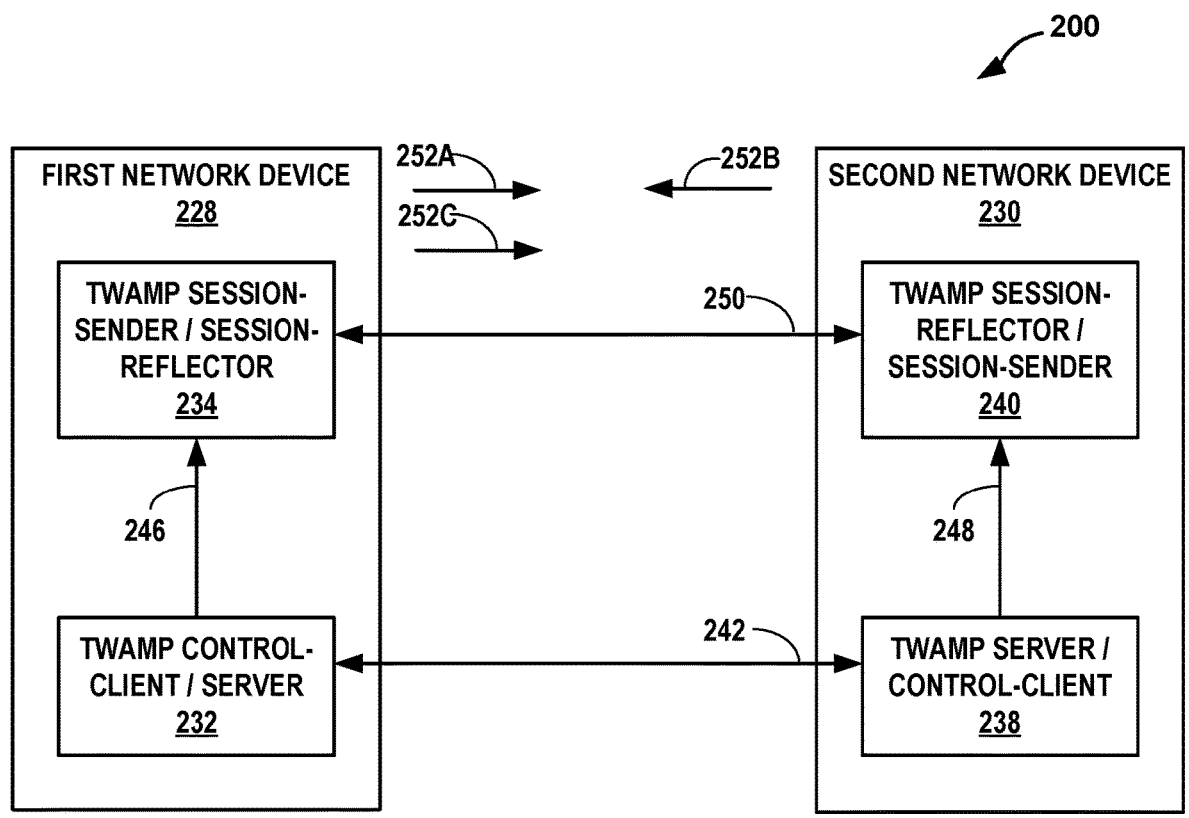
FIG. 2 is a block diagram illustrating an example TWAMP architecture including network devices configured to implement enhanced TWAMP to enable the network devices to independently measure network performance of a fully converged SD-WAN using test packets exchanged during a single TWAMP instance, in accordance with one or more aspects of the techniques described herein.
Figure 3:
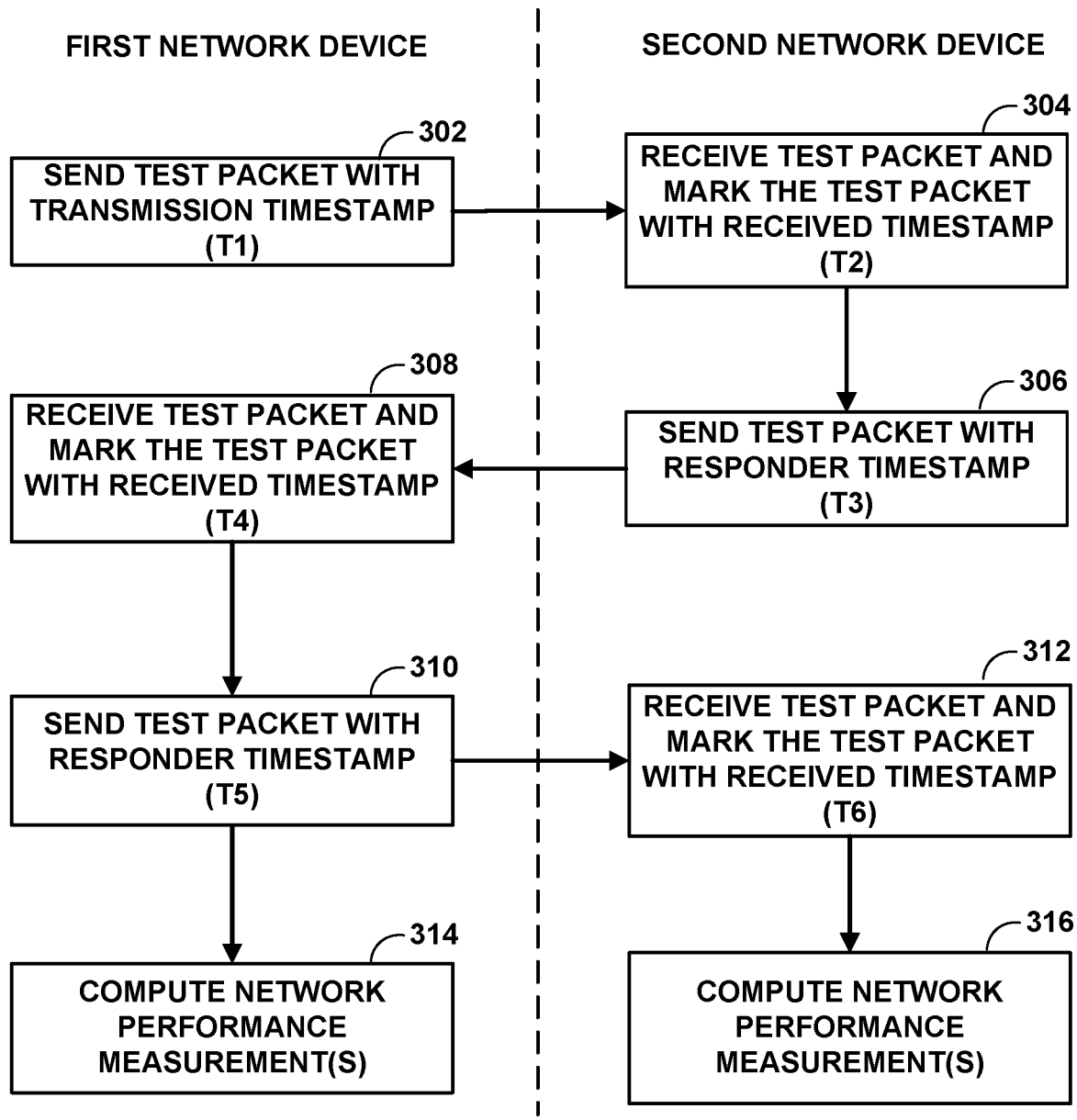
FIG. 3 is a flowchart illustrating an example operation of network devices configured to implement enhanced TWAMP to enable network devices to independently measure network performance of a fully converged SD-WAN using test packets exchanged during a single TWAMP instance, in accordance with one or more aspects of the techniques described herein.

As further described in FIGS. 2 and 3, router 18 may, in response to receiving the test packet reflected from the TWAMP session-reflector, further reflect the test packet back to the TWAMP session-reflector executed by router 8. That is, router 18 may also execute the TWAMP responder and router 8 may also execute the TWAMP controller at a different time during the test packet exchange in the same TWAMP instance. By further reflecting the test packet back to the TWAMP session-reflector executed by router 8, each of routers 8 and 18 may use the metrics embedded within the test packets exchanged during a single TWAMP instance to independently calculate the network performance measurements of application traffic over links and/or network paths of SD-WAN 7, such as round-trip delay time (RTT), jitter, etc., used to determine whether to forward traffic on the links and/or network paths or to select different links and/or network paths to forward the traffic.

Additionally, or alternatively, routers 8 and 18 may in some examples share round-trip network performance calculations. As further described in FIGS. 4 and 5, the TWAMP session-sender executed by router 18 may, in response to receiving the test packet reflected from the TWAMP session-reflector executed by router 8, calculate the network performance measurements based on the metrics that were embedded within the exchanged test packets and share the calculated network performance measurements to the TWAMP session-reflector executed by router 8. In this way, router 8 may obtain the calculated network performance measurements without having to establish a second TWAMP instance to measure network performance.

Additionally, or alternatively, routers 8 and 18 may in some examples send a delta compute time ($\Delta T$) (alternatively referred to herein as "processing time") that indicates the time from when the router receives a test packet to the time when the router sends the test packet. As further described in FIGS. 6 and 7, the TWAMP session-reflector executed by router 8 may receive a test packet from the TWAMP session-sender executed by router 18. Rather than embedding the test packet with a received timestamp and a responder timestamp, the TWAMP session-reflector may compute and send a first delta compute time ($\Delta T1$). Similarly, the TWAMP session-sender executed by router 18 may receive a test packet and compute and send a second delta compute time ($\Delta T2$) rather than a received timestamp and a responder timestamp. In this way, routers 8 and 18 may exchange test packets with a delta compute time using fewer bytes (e.g., 6 bytes) instead of exchanging larger test packets embedded with both a received timestamp and a responder timestamp. Sending the delta compute time taken to process the TWAMP test packet may avoid any time synchronization issues (e.g., that may occur by using Network Time Protocol (NTP) or Precision Time Protocol (PTP)) between nodes.

The techniques described may provide one or more technical advantages that provide at least one practical application. For example, by implementing the enhanced TWAMP, network devices of a fully converged SD-WAN may improve SD-WAN application SLA identification and best link election. For example, by implementing the enhanced TWAMP, network devices may independently perform round-trip network performance calculations during a single instance of TWAMP, which reduces the number of TWAMP instances needed to calculate round-trip network performance at each end of the SD-WAN. The reduction of the number of TWAMP instances reduces the number of control session packets and test session packets that are exchanged (e.g., by 50%), thereby reducing bandwidth consumption and computation overhead of computing devices using TWAMP to determine which links and/or network paths comply with SLA requirements to forward network traffic. Moreover, by sending a delta compute time ($\Delta T$) rather than a received timestamp and responder timestamp, fewer bytes (e.g., 6 bytes) are needed when exchanging test packets, thereby reducing the amount of computer resources and processing needed to execute a TWAMP instance. Additionally, by electing the network device having more robust system resources available to execute the TWAMP control-client, the performance of the enhanced TWAMP can be dynamically offloaded to the network device with the more robust system resources. This may be useful, for example, in situations of compute resource crisis.

FIG. 2 is a block diagram illustrating an example TWAMP architecture 200 including network devices configured to implement enhanced TWAMP to enable the network devices to independently measure network performance of a fully converged SD-WAN using test packets exchanged during a single instance of TWAMP, in accordance with one or more aspects of the techniques described herein. In this example, TWAMP architecture 200 includes a first network device 228 and a second network device 230. The first network device 228 may represent router 18 of FIG. 1 and the second network device 230 may represent router 8 of FIG. 1. The first network device 228 and second network device 230 may alternatively represent any network device of a fully converged SD-WAN that supports enhanced TWAMP.

In the example of FIG. 2, the first network device 228 and the second network device 230 may elect which of the network devices is to execute the master TWAMP control-client. In some instances, the network device with the more robust system resources and/or least load is elected to execute the master TWAMP control-client. For example, the first network device 228 and the second network device 230 may exchange control messages including current system resources usage, such as CPU, memory, etc., and/or current load (e.g., number of currently active control-clients running between network devices). In some instances, the control message may also include a flag to indicate that the network device is interested in executing a master TWAMP control-client without comparing with the system resources usage of the remote network device.

As one example, the first network device 228 initiates a control connection and shares its system resources usage (e.g., 80% CPU, 100 active control connections, interested-flag=Yes). In the event that the second network device 230 receives the system resources usage of the first network device 228 before the second network device 230 initiates the control connection, the second network device 230 may compare the system resources usage of the first network device 228 with the system resources usage of the second network device 230. If the system resources usage of the second network device 230 is more robust (e.g., higher CPU capacity and/or less load), the second network device 230 sends a TCP reset (RST) to the first network device 228 to reset the control connection initiated by the first network device 228. In response, the second network device 230 executes the master TWAMP control-client and initiates the control connection 242.

As another example, both the first network device 228 and the second network device 230 may initiate the control connection in parallel. In this example, the first network device 228 initiates the control connection and shares its system resources usage (e.g., 70% CPU, 50 active control connections, interested-flag=Yes) and the second network device 230 initiates in parallel the control connection and shares its system resources usage (e.g., 80% CPU, 100 active control connections, interested-flag=Yes). If the first network device 228 receives the system resources usage of the second network device 230 before the second network device 230 receives the system resources usage of the first network device 28, the first network device 228 may compare the system resources usage of the network devices and determine that the first network device 228 has a lower load (e.g., less active control connections). In response, the first network device 228 sends a TCP reset to the second network device 230 to reset the control connection initiated by the second network device 230. The first network device 228 then executes the master TWAMP control-client and initiates the control connection 242. Although the election of the network device to execute the master TWAMP control-client may be based on the network device with the more robust system resources usage, the election of the network device to execute the TWAMP control-client may be user-configured.

The master election process may occur periodically. For example, network devices may periodically exchange system resource usage and/or load information. In this way, the performance of the enhanced TWAMP is dynamically off-loaded to the network device with the more robust system resources.

In the example of FIG. 2, the first network device 228 is configured to execute a TWAMP controller, i.e., both a TWAMP control-client 232 and a TWAMP session-sender 234. The second network device 230 is configured to execute a TWAMP responder, i.e., both a TWAMP server 238 and a TWAMP session-reflector 240. As further described below, the first network device 228 may also execute the TWAMP responder and the second network device 230 may also execute the TWAMP controller at a different point in time during the TWAMP instance.

TWAMP control-client 232 and TWAMP server 238 may establish control connection 242. Control connection 242 may comprise a Transmission Control Protocol (TCP) connection such that control packets transmitted over control connection 242 comprise TCP packets. TWAMP control-client 232 and TWAMP server 238 exchange control packets over control connection 242 to negotiate (e.g., set up, start, and stop) test session 250 between TWAMP session-sender 234 and TWAMP session-reflector 240.

TWAMP control-client 232 and TWAMP session-sender 234 may be connected via a communication link 246. In the illustrated example wherein TWAMP control-client 232 and TWAMP session-sender 234 are executed on the same host (e.g., first network device 228), communication link 246 may comprise an internal communication link, such as a memory or bus. In other examples, where TWAMP control-client 232 and TWAMP session-sender 234 are executed on different hosts, communication link 246 may comprise an external communication link. Similarly, TWAMP server 238 and TWAMP session-reflector 240 may be connected via a communication link 248. In some examples, the different TWAMP logical roles or entities may communicate over either of communication links 246, 248 using an Extensible Messaging and Presence Protocol (XMPP) interface or any other communication protocol.

Once the TWAMP control-client 232 starts test session 250, TWAMP session-sender 234 and TWAMP session-reflector 240 may perform a three-way handshake process to exchange test packets including metrics used to measure network performance. For example, TWAMP session-sender 234 sends a test packet 252A that includes a transmission timestamp (T1) over test session 250. TWAMP session-reflector 240 receives the test packet 252A over test session 250 and marks the test packet with a received timestamp (T2). TWAMP session-reflector 240 may mark the test packet with a responder timestamp (T3) and sends the test packet (illustrated as test packet 252B) over test session 250. TWAMP session-sender 234 receives the test packet 252B over test session 250 and marks the test packet with a received timestamp (T4). In accordance with one or more aspects of the techniques described herein, the first network device 228 may also execute a TWAMP responder and the second network device 230 may also execute a TWAMP controller (e.g., TWAMP session-sender) at a different time during the same TWAMP instance. For example, the TWAMP session-reflector 234 executed by the first network device 228 marks the test packet with a responder timestamp (T5) and sends the test packet (illustrated as test packet 252C) over test session 250. TWAMP session-sender 240 executed by the second network device 240 receives the test packet 252C over test session 250 and marks the test packet with a received timestamp (T6).

TWAMP control-client 232 and TWAMP server 238 (or some other module executed by the network devices) may each use the received metrics (e.g., timestamps) to compute the network performance measurements between first network device 228 and second network device 230. For example, TWAMP control-client 232 and TWAMP server 238 may extract timestamps (e.g., T1-T6), respectively, that were embedded within the test packets exchanged during the single TWAMP instance, and independently calculate round-trip performance.

For example, TWAMP control-client 232 may compute round-trip time (RTT) based on the time from when the first network device 238 transmitted the test packet 252A to the time the first network device 228 received the response test packet 252B, excluding the processing time by the second network device 230 (e.g., the time from when the second network device 230 receives the test packet 252A to the time when the second network device 230 sends the response test packet 252B), as shown below:

$$RTT=(T4-T1)-(T3-T2)$$

TWAMP server 238 may also compute RTT based on the time from when the second network device 230 transmitted the test packet 252B to the time the second network device 230 received the response test packet 252C, excluding the processing time by the first network device 228 (e.g., the time from when the first network device 228 receives the test packet 252B to the time when the first network device 228 sends the response test packet 252C), as shown below:

$$RTT=(T6-T3)-(T5-T4)$$

TWAMP control-client 232 may additionally, or alternatively, calculate jitter using the T1, T2, T3, and T4 timestamps between consecutive packets. For example, jitter is measured as the difference between two successive round trip times (RTT). For example, TWAMP control-client 232 derives a first RTT ($RTT_1$) calculated from a first set of test packets, a second RTT ($RTT_2$) calculated form a second set of test packets, a third RTT ($RTT_3$) calculated form a third set of test packets, and so on (e.g., $RTT_N$ calculated from an Nth set of test packets). A TWAMP control-client may derive an RTT by sending a set of test packets between a TWAMP session-sender and TWAMP session-reflector, and vice versa. A first jitter ($JITTER_1$) may be calculated based on the difference between RTT2 and RTT1, a second jitter ($JITTER_2$) is calculated based on the difference between RTT3 and RTT2, and so on ($JITTER_N=RTT_N-RTT_{N-1}$). Similarly, TWAMP server 238 may additionally, or alternatively, calculate jitter using the T3, T4, T5, and T6 timestamps between consecutive packets.

FIG. 3 is a flowchart illustrating an example operation of network devices configured to implement enhanced TWAMP to enable the network devices to independently measure network performance of a fully converged SD-WAN using test packets exchanged during a single TWAMP instance, in accordance with one or more aspects of the techniques described herein. FIG. 3 is described with respect to the enhanced TWAMP implemented by the first network device and the second network device described in FIG. 2.

In the example of FIG. 3, TWAMP session-sender 234 executed by the first network device 238 sends a test packet 252A that includes a transmission timestamp (T1) over test session 250 (302). TWAMP session-reflector 240 executed by the second network device 230 receives the test packet 252A over test session 250 and marks the test packet with a received timestamp (T2) (304). TWAMP session-reflector 240 may mark the test packet with a responder timestamp (T3) and sends the test packet (illustrated as test packet 252B) over test session 250 (306). TWAMP session-sender 234 receives the test packet 252B over test session 250 and marks the test packet with a received timestamp (T4) (308).

The TWAMP session-reflector 234 executed by the first network device 228 marks the test packet with a responder timestamp (T5) and sends the test packet (illustrated as test packet 252C) over test session 250 (310). TWAMP session-sender 240 executed by the second network device 230 receives the test packet 252C over test session 250 and marks the test packet with a received timestamp (T6) (312).

The first network device 228 may compute network performance measurements using the metrics included in the test packets (314). For example, the first network device 228 may extract the timestamps T1-T4 to compute a RTT and/or jitter. Similarly, the second network device 230 may compute network performance measurements using the metrics included in the test packets (316). For example, the second network device 230 may extract the timestamps T3-T6 to compute a RTT and/or jitter.

Figure 4:
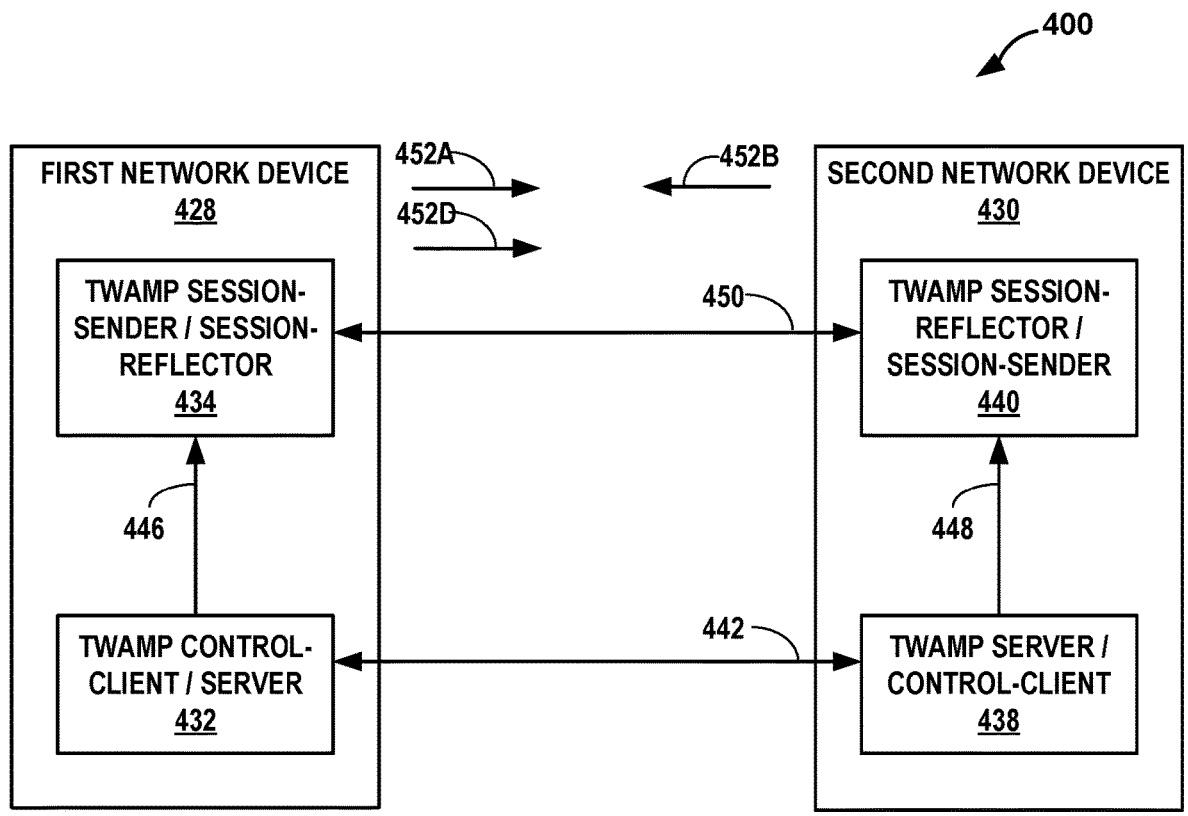
FIG. 4 is a block diagram illustrating another example TWAMP architecture including network devices configured to implement enhanced TWAMP that facilitates sharing of a round-trip network performance calculation, in accordance with one or more aspects of the techniques described herein.

FIG. 4 is a block diagram illustrating an example TWAMP architecture 400 including network devices configured to implement enhanced TWAMP that facilitates sharing of a round-trip network performance calculation, in accordance with one or more aspects of the techniques described herein. In this example, the first network device 428 and the second network device 430 of FIG. 4 may elect a master TWAMP control-client similar to the first network device 228 and the second network device 230 of FIG. 2, but operate the test session differently as described below.

Once the master TWAMP control-client election is completed (e.g., in this example, the first network device 428 is elected), TWAMP session-sender 434 executed by the first network device 428 sends a test packet 452A for test session 450 that includes a transmission timestamp (T1). TWAMP session-reflector 440 executed by the second network device 430 receives the test packet 452A over test session 450 and marks the test packet with a received timestamp (T2). TWAMP session-reflector 440 marks the test packet with a responder timestamp (T3) and sends the test packet (illustrated as test packet 452B) over test session 450. TWAMP session-sender/reflector 434 may receive the test packet 452B over test session 450 and marks the test packet with a received timestamp (T4).

The first network device 428 calculates round-trip performance (e.g., RTT or jitter) as described above using timestamps T1-T4. In this example, TWAMP session-sender 434 sends the test packet 452D with the round-trip network performance calculation to TWAMP session-reflector 440. TWAMP session-reflector 440 receives the test packet 452D over test session 450 and may obtain the calculated network performance measurements calculated by TWAMP control-client 432 without having to establish a second TWAMP instance to measure network performance the round-trip performance.

Figure 5:
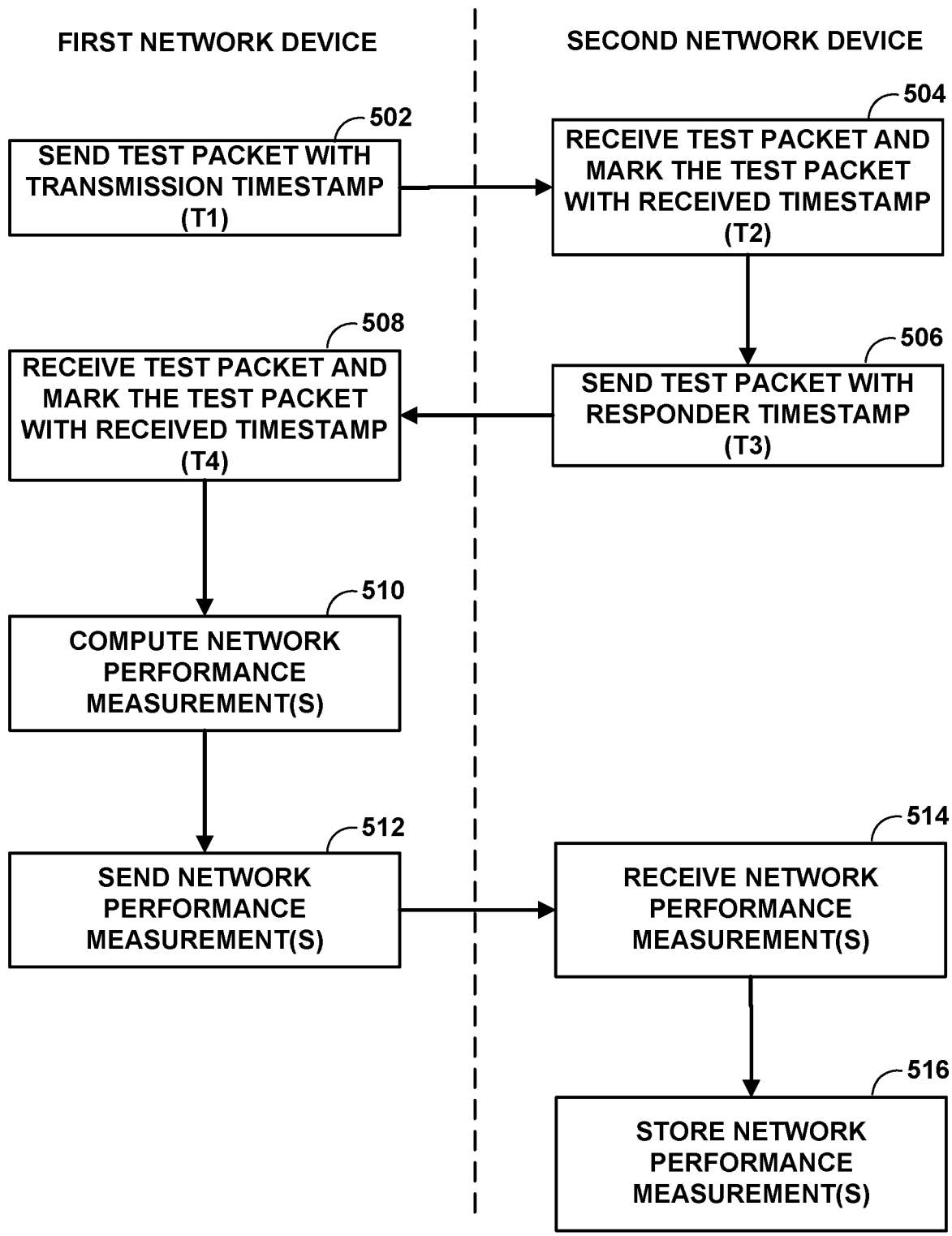
FIG. 5 is a flowchart illustrating an example operation of network devices configured to implement enhanced TWAMP that facilitates sharing of a round-trip network performance calculation, in accordance with one or more aspects of the techniques described herein.

FIG. 5 is a flowchart illustrating an example operation of network devices configured to implement enhanced TWAMP that facilitates sharing of a round-trip network performance calculation, in accordance with one or more aspects of the techniques described herein. FIG. 5 is described with respect to the enhanced TWAMP implemented by the first network device and the second network device described in FIG. 4.

In the example of FIG. 5, TWAMP session-sender 434 executed by the first network device 438 sends a test packet 452A that includes a transmission timestamp (T1) over test session 450 (502). TWAMP session-reflector 440 executed by the second network device 430 receives the test packet 452A over test session 450 and marks the test packet with a received timestamp (T2) (504). TWAMP session-reflector 440 may mark the test packet with a responder timestamp (T3) and sends the test packet (illustrated as test packet 452B) over test session 450 (506). TWAMP session-sender 434 receives the test packet 452B over test session 450 and marks the test packet with a received timestamp (T4) (508).

The first network device 428 may compute network performance measurements using the metrics included in the test packets (510). For example, the first network device 428 may extract the timestamps T1-T4 to compute a RTT and/or jitter. The TWAMP session-sender 434 executed by the first network device 428 sends the test packet including the network performance calculations over test session 450 to the TWAMP session-reflector 440 (512). The TWAMP session-reflector receives the test packet including the network performance calculations over test session 450 (514) and stores the network performance calculations (516).

Figure 6:
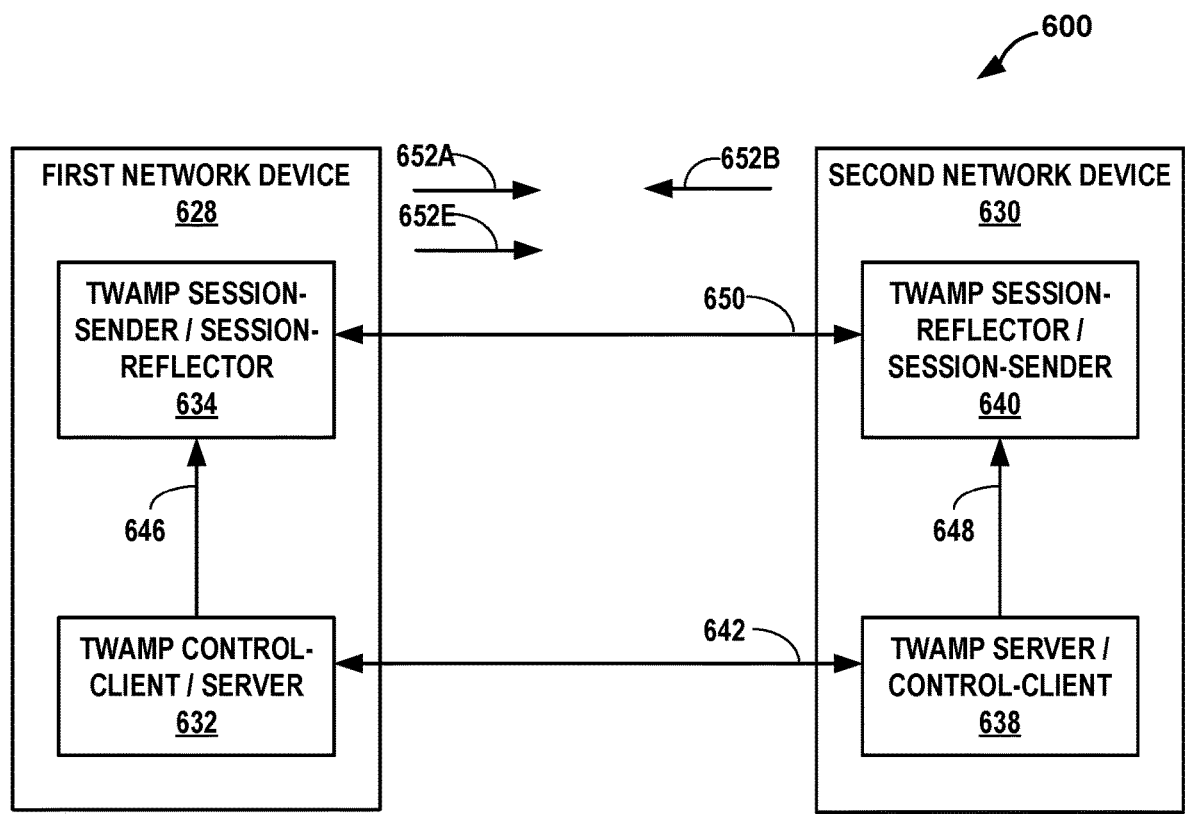
FIG. 6 is a block diagram illustrating another example TWAMP architecture including network devices configured to implement enhanced TWAMP that sends a delta compute time, in accordance with one or more aspects of the techniques described herein.

FIG. 6 is a block diagram illustrating an example TWAMP architecture 600 including network devices configured to implement enhanced TWAMP that sends a delta compute time, in accordance with one or more aspects of the techniques described herein. In this example, the first network device 628 and the second network device 630 of FIG. 6 may elect a master TWAMP control-client similar to the first network device 228 and the second network device 230 of FIG. 2, but operate the test session differently as described below.

Once the master TWAMP control-client election is completed (e.g., in this example, the first network device 628 is elected), TWAMP session-sender 634 may send a test packet 652A including a transmission timestamp (T1) over test session 650. TWAMP session-reflector 640 may receive test packet 652A and compute the delta compute time (ΔT1), which is the time from when the TWAMP session-reflector 640 receives the test packet to the time when the TWAMP session-reflector 640 sends the test packet back to TWAMP session-sender 634. For example, TWAMP session-reflector 640 may compute the difference between the time TWAMP session-reflector 640 sends the test packet back to TWAMP session-sender 634 (response time) and the time TWAMP session-reflector 640 received test packet 652A. Instead of sending the test packet with a received timestamp and responder timestamp, TWAMP session-reflector 640 may send test packet 652B including the delta compute time (ΔT1) and may mark the test packet 652B with a transmission timestamp (T2) (to calculate two-way metrics for the second network device 630). TWAMP session-sender 634 receives test packet 652B over test session 650 and marks the test packet 652B with a received timestamp (T3). TWAMP session-sender 634 may compute the delta compute time (ΔT2) taken to receive and send back the test packet to TWAMP session-reflector 640. Instead of sending the test packet with a received timestamp and responder timestamp, TWAMP session-sender 634 may send test packet 652E including the delta compute time (ΔT2) over test session 650. TWAMP session-reflector 640 receives test packet 652E over test session 650 and marks the test packet with a received timestamp (T4).

TWAMP control-client 632 and TWAMP server 638 (or some other module executed by the network devices) may use the received metrics to compute the network performance measurements between first network device 628 and second network device 630. For example, TWAMP control-client 632 and TWAMP server 638 may extract timestamps (e.g., T1-T4, ΔT1, ΔT2), respectively, that were embedded within the test packets during the round-trip, thus allowing the first network device 628 and the second network device 630 to perform round-trip performances calculation within a single TWAMP instance.

For example, TWAMP control-client 632 may compute RTT based on the time from when the first network device 628 transmitted the test packet 652A to the time the first network device 628 received the response test packet 652B, excluding the delta compute time (ΔT1) computed by the second network device 630, as shown below:

$$RTT=(T3-T1)-[\Delta T1]$$

TWAMP server 638 may also compute RTT based on the time from when the second network device 630 transmitted the test packet 652B to the time the second network device 630 received the response test packet 652D, excluding the delta compute time (ΔT2) computed by the first network device 628, as shown below:

$$RTT=(T4-T2)-[\Delta T2]$$

TWAMP control-client/server 632 and TWAMP server/control-client 638 may additionally, or alternatively, calculate jitter using the consecutive measured RTTs (as described above).

By sending the delta compute time (ΔT) rather than the received and responder timestamps, fewer bytes (e.g., 6 bytes) of a test packet may be sent by the TWAMP session-sender or TWAMP session-reflector (e.g., test packets 652B and 652E).

Figure 7:
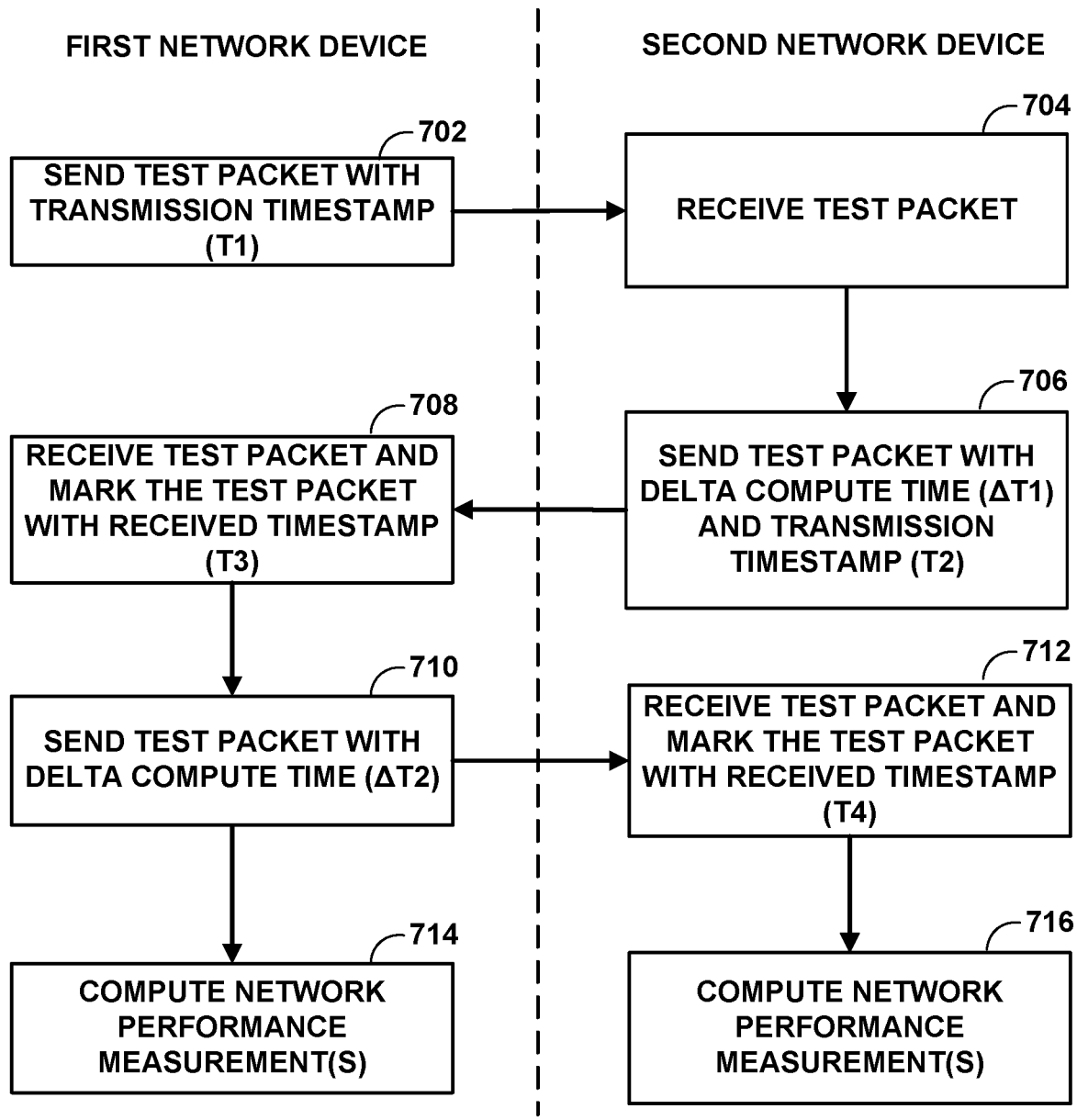
FIG. 7 is a flowchart illustrating an example operation of network devices configured to implement enhanced TWAMP that sends a delta compute time, in accordance with one or more aspects of the techniques described herein.

FIG. 7 is a flowchart illustrating an example operation of network devices configured to perform enhanced TWAMP that sends a delta compute time, in accordance with one or more aspects of the techniques described herein. FIG. 7 is described with respect to the enhanced TWAMP implemented by the first network device and the second network device described in FIG. 6.

In the example of FIG. 7, TWAMP session-sender 634 executed by the first network device 628 sends a test packet 652A that includes a transmission timestamp (T1) over test session 650 (702). TWAMP session-reflector 640 executed by the second network device 630 receives the test packet 652A over test session 650 (704).

TWAMP session-reflector 640 may compute a delta compute time (ΔT1) (e.g., time from when the TWAMP session-reflector 640 receives the test packet to the time when the TWAMP session-reflector 640 sends the test packet back to TWAMP session-sender 634). TWAMP session-reflector 640 sends the test packet including the delta compute time (ΔT1) and a transmission timestamp (T2) over test session 650 (706). TWAMP session-sender 634 receives the test packet 652B over test session 650 and marks the test packet with a received timestamp (T3) (708).

TWAMP session-sender 634 may compute a delta compute time (ΔT2) (e.g., time from when the TWAMP session-sender 634 receives the test packet to the time when the TWAMP session-sender 634 sends the test packet back to TWAMP session-reflector 640). TWAMP session-sender 634 sends the test packet including the delta compute time (ΔT2) over test session 650 to TWAMP session-reflector 640 (710). The TWAMP session-reflector 640 receives the test packet and marks the test packet with a received timestamp (T4).

The first network device 628 may compute network performance measurements using the metrics and delta compute time (ΔT1) included in the test packets (714). For example, the first network device 628 may extract the timestamps T1, T3, and ΔT1 to compute a RTT and/or jitter. Similarly, the second network device 630 may compute network performance measurements using the metrics and delta compute time (ΔT2) included in the test packets (716). For example, the second network device 630 may extract the timestamps T2, T4, and ΔT2 to compute a RTT and/or jitter.

Figure 8:
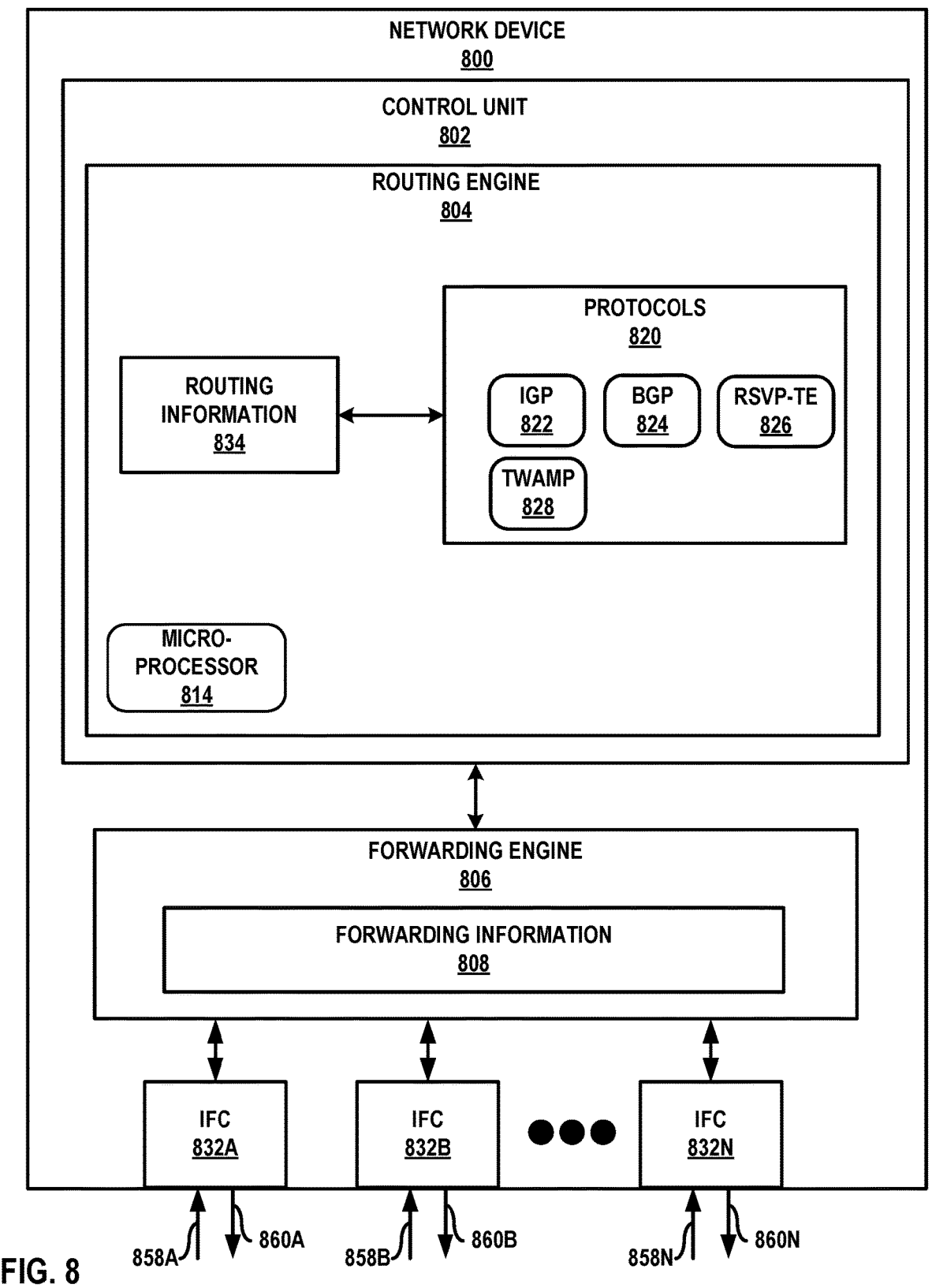
FIG. 8 is a block diagram illustrating an example network device configured to provide enhanced TWAMP to measure network performance of links and/or network paths of a fully converged SD-WAN, using a single TWAMP instance, in accordance with one or more aspects of the techniques described herein.

FIG. 8 is a block diagram illustrating an example network device configured to provide enhanced TWAMP to measure network performance of links and/or network paths of a fully converged SD-WAN, using a single TWAMP instance, in accordance with one or more aspects of the techniques described herein. Network device 800 of FIG. 8 may represent any of routers 8 or 18 of FIG. 1, and the network devices of any FIGS. 2, 4, and 6 in further detail.

Network device 800 includes a control unit 802 that includes a routing engine 804, and control unit 802 is coupled to forwarding engine 806 (otherwise referred to herein as "forwarding unit 806"). Forwarding engine 806 is associated with one or more of interface cards 832A-832N ("IFCs 832") that receive packets via inbound links 858A-858N ("inbound links 858") and send packets via outbound links 860A-860N ("outbound links 860"). IFCs 832 are typically coupled to links 858, 860 via a number of interface ports (not shown). Interfaces for inbound links 858 and outbound links 860 may represent physical interfaces, logical interfaces, or some combination thereof. Interfaces for links 858, 860 may represent local interfaces of network device 800 for WAN links to network devices of SD-WAN 7 of FIG. 1.

In general, control unit 802 may represent hardware or a combination of hardware and software of control that implements one or more protocols 820 to learn and maintain routing information 834. Routing information 834 may include information defining a topology of a network, such as service provider network 2 of FIG. 1. For example, routing information may define routes (e.g., series of next hops) through a network to destinations/prefixes within the network learned via a distance-vector routing protocol (e.g., BGP 824) or defines the network topology with interconnected links learned using a link state routing protocol (e.g., ISIS—or OSPF) of IGP 822. Protocols 820 interact with a kernel (not shown in FIG. 8), e.g., by way of API calls, executing on control unit 802 to update routing information 834 based on routing protocol messages received by network device 800. The kernel of control unit 802 executes master microprocessor(s) 814 and may comprise, for example, a UNIX operating system derivative such as Linux or Berkeley Software Distribution (BSD). The kernel offers libraries and drivers by which user-level processes may interact with the underlying system. Microprocessor 814 that executes program instructions loaded into a main memory (not shown in FIG. 8) from a storage device (also not shown in FIG. 8) in order to execute the software stack, including both the kernel and processes executing on the operating environment provided by the kernel. Microprocessor 814 may represent one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein.

The kernel processes kernel calls from routing protocols 802 to generate forwarding information 808 based on the network topology represented in routing information 834. Typically, forwarding information 808 is generated in the form of radix or other lookup trees to map packet information (e.g., header information having destination information and/or a label stack) to next hops and ultimately to interface ports of IFCs 832 associated with forwarding engine 806. Forwarding information 808 may associate, for example, network destinations with specific next hops and corresponding IFCs 832. For MPLS-related traffic forwarding, forwarding information 808 stores label information that includes an incoming label, and outgoing label, and a next hop for a packet. Control unit 802 may then program forwarding engine 806 of the network device data plane with forwarding information 808, which installs the forwarding information within an application specific integrated circuit (ASIC) (not shown in FIG. 8), for example.

The architecture of network device 800 illustrated in FIG. 8 is shown for example purposes only. This disclosure is not limited to this architecture. In other examples, network device 800 may be configured in a variety of ways. In one example, some of the functionality of control unit 802 may be distributed within IFCs 832. Control unit 802 may be implemented solely in software, or hardware, or may be implemented as combinations of software, hardware, or firmware. For example, control unit 802 may include one or more of a processor, a programmable processor, a general purpose processor, a digital signal processor (DSP), an integrated circuit, an application specific integrated circuit (ASIC), a field programmable gate array (FPGA), or any type of hardware unit capable of implementing the techniques described herein. Control unit 802 may further include one or more processors which execute software instructions stored, embodied, or encoded in a computer-readable medium, such as a computer-readable storage medium. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), Flash memory, a hard disk, a CD-ROM, a floppy disk, a cassette, a solid state drive, magnetic media, optical media, or other computer-readable media. In some instances, the computer-readable storage medium may include instructions that cause a programmable processor to perform the techniques described herein.

In the example of FIG. 8, routing engine 804 provides an operating environment of one or more traffic engineering protocols to establish tunnels for forwarding subscriber packets through the ordered set of service nodes 10 associated with different service chains. For example, Resource Reservation Protocol with Traffic Engineering extensions (RSVP-TE) 826 may exchange traffic engineering information, such as MPLS labels for enabling label-based packet forwarding. As another example, routing engine 804 may use GRE or IP-based tunneling protocols (not shown) to establish traffic engineered tunnels. Routing engine 804 may maintain, for example, a traffic engineering database (TED)

(not shown in FIG. 8) to store the traffic engineering data. Although not shown in FIG. 8, protocols 820 may include other protocols, such as label distribution protocol (LDP) or other traffic engineering protocols.

Routing engine 804 provides an operating environment of TWAMP 828. For example, routing engine 804 may use TWAMP 828 to execute one or more TWAMP logical roles, such as a TWAMP control-client, a TWAMP server, a TWAMP session-sender, and a TWAMP session-reflector. According to the techniques described in this disclosure, TWAMP 828 may be extended to enable the network devices to independently perform network performance calculations, share network performance calculations, and/or send delta compute times with a single TWAMP instance. Network device 800 is described herein as either a first endpoint configured to execute a TWAMP control-client and/or an associated TWAMP session-sender, or as a second endpoint configured to execute a TWAMP server and/or an associated TWAMP session-reflector. In some examples, network device 800 may serve as a first endpoint for a first TWAMP session and also serve as a second endpoint for a second TWAMP session. For example, at a given time, network device 800 may operate as an elected master TWAMP control-client towards a one endpoint for a first TWAMP session and may also operate as a secondary TWAMP server towards another endpoint for a second TWAMP session.

The disclosed techniques include extending TWAMP 828 to elect a network device to execute a master TWAMP control-client. For example, network device 800 may indicate its interest in being elected to execute the master TWAMP control-client. Network device 800 may initiate a control connection and share system resource usage and/or load information to another endpoint of the TWAMP. Network device 800 may share system resource usage and/or load information using TCP, for example. In some examples, the network device 800 may receive a TCP reset from the other endpoint to reset the control connection initiated by network device 800. In these examples, the other endpoint of the TWAMP may determine from a comparison of the system resource usage and/or load information that the other endpoint has more robust system resources and/or load. The other endpoint sends a TCP reset and then executes as a TWAMP control-client and/or TWAMP session-sender.

In some examples, the network device 800 may initiate a control connection in parallel with the other endpoint of the TWAMP. In these examples, network device 800 shares system resource usage and/or load information to the other endpoint and may receive system resource usage and/or load information from the other endpoint. If network device 800 receives the system resource usage and/or load information from the endpoint before the endpoint receives the system resource usage and/or load information of network device 800, network device 800 may compare the system resource usage and/or load information and determine whether network device 800 has a more robust system resource usage and/or load. If network device 800 determines that it has more robust system resources and/or load, network device 800 sends a TCP reset to the endpoint at the other end of the TWAMP to reset the control connection initiated by the endpoint. Network device 800 then executes the master TWAMP control-client and initiates the control connection.

The disclosed techniques include extending TWAMP 828 to enable network devices to independently measure network performance of a fully converged SD-WAN using test packets exchanged during a single instance of TWAMP. For example, network device 800, operating as the TWAMP session-sender, may send a test packet that includes a transmission timestamp (T1) over a test session with another endpoint operating as the TWAMP session-reflector. When operating as the TWAMP session-sender (e.g., in forwarding engine 806), network device 800 may receive a test packet reflected back from the TWAMP session-reflector that includes a received timestamp (T2) and responder timestamp (T3) embedded within the test packet. Network device 800 may mark the test packet with a received timestamp (T4). Network device 800 may also operate as the TWAMP session-reflector to reflect the test packet back to the other endpoint. For example, when operating as the TWAMP session-reflector, network device 800 may mark the test packet with a responder timestamp (T5) and send the test packet over the test session to the other endpoint. Network device 800 may extract the embedded metrics (e.g., timestamps) and perform network performance calculations (e.g., RTT, jitter, etc.).

In other examples, network device 800, operating as the TWAMP session-reflector, may receive a test packet that includes a transmission timestamp (T1) over a test session from another endpoint operating as the TWAMP session-sender. When operating as the TWAMP session-reflector, network device 800 may mark the received test packet with a received timestamp (T2) and send the test packet back to the TWAMP session-sender including a responder timestamp (T3). Network device 800 may also operate as the TWAMP session-sender to receive the test packet reflected back from the other endpoint. For example, when operating as the TWAMP session-sender, network device 800 may receive the test packet with a responder timestamp (T5) and mark the test packet with a received timestamp (T6). Network device 800 may extract the embedded metrics (e.g., timestamps) and perform network performance calculations (e.g., RTT, jitter, etc.).

The disclosed techniques additionally, or alternatively, include extending TWAMP 828 to enable network devices to send network performance calculations. For example, network device 800, operating as the TWAMP session-sender, may send a test packet that includes a transmission timestamp (T1) over a test session with another endpoint operating as the TWAMP session-reflector. When operating as the TWAMP session-sender, network device 800 may receive a test packet reflected back from the TWAMP session-reflector that includes a received timestamp (T2) and responder timestamp (T3) embedded within the test packet. Network device 800 may mark the test packet with a received timestamp (T4). Network device 800 may extract the embedded metrics (e.g., timestamps) and perform network performance calculations (e.g., RTT, jitter, etc.). Network device 800 may send the network performance calculations over the test session to the other endpoint.

In other examples, network device 800, operating as the TWAMP session-reflector, may receive a test packet that includes a transmission timestamp (T1) over a test session from another endpoint operating as the TWAMP session-sender. When operating as the TWAMP session-reflector, network device 800 may mark the received test packet with a received timestamp (T2) and send the test packet back to the TWAMP session-sender including a responder timestamp (T3). Network device 800 may receive the test packet reflected back from the other endpoint including network performance calculations and stores the network performance calculations.

The disclosed techniques additionally, or alternatively, include extending TWAMP 828 to enable network devices to send delta compute times. For example, network device 800, operating as the TWAMP session-sender, may send a test packet that includes a transmission timestamp (T1) over a test session with another endpoint operating as the TWAMP session-reflector. When operating as the TWAMP session-sender, network device 800 may receive a test packet reflected back from the TWAMP session-reflector that includes a transmission timestamp (T2) and a delta compute time (ΔT1), which is the time from when the TWAMP session-reflector receives the test packet to the time when the TWAMP session-reflector sends the test packet back to TWAMP session-sender. The network device 800 receives test packet over test session and marks the test packet with a received timestamp (T3). TWAMP session-sender may compute the delta compute time (ΔT2) taken to receive and send back the test packet to TWAMP session-reflector. |Network device 800 may extract timestamps Ie.g., T1, T3) and a delta compute time (ΔT1) to compute the network performance measurements.

In other examples, network device 800, operating as the TWAMP session-reflector, may receive a test packet that includes a transmission timestamp (T1) over a test session from another endpoint operating as the TWAMP session-sender. When operating as the TWAMP session-reflector, network device 800 may compute the delta compute time (ΔT1) taken to receive and send back the test packet to TWAMP session-sender. Network device 800 may send the test packet including the delta compute time (ΔT2) and the transmission timestamp (T2) to the TWAMP session-reflector. Network device 800 may receive a test packet including a delta compute time (ΔT2) computed by the TWAMP session-sender and marks the test packet with a received timestamp (T4). Network device 800 may extract timestamps (e.g., T2, T4) and a delta compute time (ΔT2) to compute the network performance measurements.

The techniques described in this disclosure may be implemented, at least in part, in hardware, software, firmware or any combination thereof. For example, various aspects of the described techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include RAM, ROM, PROM, EPROM, EEPROM, flash memory, a hard disk, a CD-ROM, a floppy disk, a cassette, magnetic media, optical media, or another computer-readable storage media. It should be understood that the term "computer-readable storage media" refers to physical storage media, and not signals, carrier waves, or other transient media.

What is claimed is:

1. A method comprising:
    establishing a Two-Way Active Measurement Protocol (TWAMP) session between a first network device and a second network device, wherein the TWAMP session comprises a single test session between a TWAMP session-sender executed on the first network device and a TWAMP session-reflector executed on the second network device and between a TWAMP session-sender executed on the second network device and a TWAMP session-reflector executed on the first network device;
    exchanging, during the single test session between the TWAMP session-sender executed on the first network device and the TWAMP session-reflector executed on the second network device and between the TWAMP session-sender executed on the second network device and the TWAMP session-reflector executed on the first network device, a plurality of TWAMP test packets including one or more metrics; and
    computing, by the first network device or the second network device, based on the one or more metrics of the plurality of TWAMP test packets, at least one active round-trip network performance measurement for a link between the first network device and the second network device.

2. The method of claim 1, wherein exchanging the TWAMP test packet during the single test session comprises:
    sending, by the TWAMP session-sender executed on the first network device and to the TWAMP session-reflector executed on the second network device, a first TWAMP test packet of the plurality of TWAMP test packets, the first TWAMP test packet including a first one or more metrics of the one or more metrics;
    in response to receiving the first TWAMP test packet from the TWAMP session-sender executed on the first network device, sending, by the TWAMP session-reflector executed on the second network device, a second TWAMP test packet of the plurality of TWAMP test packets back to the TWAMP session-sender executed on the first network device, the second TWAMP test packet including a second one or more metrics of the one or more metrics; and
    in response to receiving the second TWAMP test packet from the TWAMP session-reflector executed on the second network device, sending, by the TWAMP session-reflector executed on the first network device, a third TWAMP test packet of the plurality of TWAMP test packets back to the TWAMP session-sender executed on the second network device, the third TWAMP test packet including a third one or more metrics of the one or more metrics.

3. The method of claim 2,
    wherein the first one or more metrics comprise at least a transmission timestamp that indicates when the first TWAMP test packet was originally sent from the TWAMP session-sender executed on the first network device to the TWAMP session-reflector executed on the second network device, wherein the second one or more metrics comprise a first responder timestamp that indicates when the second TWAMP test packet was sent back to the TWAMP session-sender executed on the first network device from the TWAMP session-reflector executed on the second network device and a receive timestamp that indicates when the TWAMP session-reflector executed on the second network device received the first TWAMP test packet from the TWAMP session-sender executed on the first network device, and wherein the third one or more metrics comprise a second responder timestamp that indicates when the third TWAMP test packet was sent back to the TWAMP session-sender executed on the second network device from the TWAMP session-reflector executed on the first network device and a receive timestamp that indicates when the TWAMP session-reflector executed on the first received the second TWAMP test packet from the TWAMP session-reflector executed on the second network device.

4. The method of claim 3, wherein computing at least one active round-trip network performance measurement for the link between the first network device and the second network device comprises:

computing, by the first network device, a first portion of the at least one active round-trip network performance measurement based on the first one or more metrics and the second one or more metrics; and computing, by the second network device, a second portion of the at least one active round-trip network performance measurement based on the second one or more metrics and the third one or more metrics.

5. The method of claim 2, wherein the first one or more metrics comprise at least a transmission timestamp that indicates when the first TWAMP test packet was sent from the TWAMP session-sender executed on the first network device to the TWAMP session-reflector executed on the second network device, wherein the second one or more metrics comprise a first responder timestamp that indicates when the second TWAMP test packet was sent back to the TWAMP session-sender executed on the first network device from the TWAMP session-reflector executed on the second network device and a receive timestamp that indicates when the TWAMP session-reflector executed on the second network device received the second TWAMP test packet from the TWAMP session-sender executed on the first network device, and wherein the third one or more metrics comprise the at least one active round-trip network performance measurement for the link between the first network device and the second network device, wherein the at least one active round-trip network performance measurement is computed by the first network device based on the first one or more metrics and the second one or more metrics.

6. The method of claim 5, wherein computing at least one active round-trip network performance measurement for the link between the first network device and the second network device comprises:

computing, by the first network device, the at least one active round-trip network performance measurement based on the first one or more metrics and the second one or more metrics; and sending, by the first network device and to the second network device, the at least one active round-trip network performance measurement as the third one or more metrics.

7. The method of claim 2, wherein the first one or more metrics comprise at least a transmission timestamp that indicates when the first TWAMP test packet was sent from the TWAMP session-sender executed on the first network device to the TWAMP session-reflector executed on the second network device;

wherein the second one or more metrics comprise at least a first delta compute time that indicates a time from when the TWAMP session-reflector executed on the second network device receives the first TWAMP test packet to a time when the TWAMP session-reflector executed on the second network device sends the second TWAMP test packet back to the TWAMP session-sender executed on the first network device;

wherein the third one or more metrics comprise at least a second delta compute time that indicates a time from when the TWAMP session-sender executed on the first network device receives the second TWAMP test packet to a time when the TWAMP session-sender executed on the first network device sends the third TWAMP test packet back to the TWAMP session-reflector executed on the second network device.

8. The method of claim 7, wherein computing at least one active round-trip network performance measurement for the link between the first network device and the second network device comprises:

computing, by the first network device, a first portion of the at least one active round-trip network performance measurement based on the second one or more metrics; and computing, by the second network device, a second portion of the at least one active round-trip network performance measurement based on the third one or more metrics.

9. A system comprising:

a first network device executing a Two-Way Active Measurement Protocol (TWAMP) session-sender and a TWAMP session-reflector for a single test session; and a second network device executing a TWAMP session-reflector and a TWAMP session-sender for the single test session, wherein the first network device and the second network device are each configured to:

establish a TWAMP session between the first network device and the second network device, wherein the TWAMP session comprises the single test session between the TWAMP session-sender executed on the first network device and the TWAMP session-reflector executed on the second network device and between the TWAMP session-sender executed on the second network device and the TWAMP session-reflector executed on the first network device;

exchange, during the single test session between the TWAMP session-sender executed on the first network device and the TWAMP session-reflector executed on the second network device and between the TWAMP session-sender executed on the second network device and the TWAMP session-reflector executed on the first network device, a plurality of TWAMP test packets including one or more metrics; and compute, based on the one or more metrics of the plurality of TWAMP test packets, at least one active round-trip network performance measurement for a link between the first network device and the second network device.

10. The system of claim 9, wherein, to exchange the plurality of TWAMP test packets, the first network device is further configured to:
send a first TWAMP test packet of the plurality of TWAMP test packets, the first TWAMP test packet including a first one or more metrics of the one or more metrics; and send, in response to receiving a second TWAMP test packet of the plurality of TWAMP test packets from the TWAMP session-reflector executed on the second network device, a third TWAMP test packet of the plurality of TWAMP test packets back to the TWAMP session-sender executed on the first network device, the third TWAMP test packet including a third one or more metrics of the one or more metrics, and wherein, to exchange the plurality of TWAMP test packets, the second network device is further configured to:
send, in response to receiving the first TWAMP test packet from the TWAMP session-sender executed on the first network device, the second TWAMP test packet back to the TWAMP session-sender executed on the first network device, the second TWAMP test packet including a second one or more metrics of the one or more metrics; and receive, from the TWAMP session-reflector executed on the first network device, the third TWAMP test packet including the third one or more metrics of the one or more metrics.

11. The system of claim 10, wherein the first one or more metrics comprise at least a transmission timestamp that indicates when the first TWAMP test packet was originally sent from the TWAMP session-sender executed on the first network device to the TWAMP session-reflector executed on the second network device, wherein the second one or more metrics comprise a first responder timestamp that indicates when the second TWAMP test packet was sent back to the TWAMP session-sender executed on the first network device from the TWAMP session-reflector executed on the second network device and a receive timestamp that indicates when the TWAMP session-reflector executed on the second network device received the first TWAMP test packet from the TWAMP session-sender executed on the first network device, and wherein the third one or more metrics comprise a second responder timestamp that indicates when the third TWAMP test packet was sent back to the TWAMP session-sender executed on the second network device from the TWAMP session-reflector executed on the first network device and a receive timestamp that indicates when the TWAMP session sender executed on the first network device received the second TWAMP test packet from the TWAMP session-reflector executed on the second network device.

12. The system of claim 11, wherein, to compute at least one active round-trip network performance measurement for the link between the first network device and the second network device, the first network device is further configured to compute a first portion of the at least one active round-trip network performance measurement based on the first one or more metrics and the second one or more metrics; and wherein, to compute at least one active round-trip network performance measurement for the link between the first network device and the second network device, the second network device is further configured to compute a second portion of the at least one active round-trip network performance measurement based on the second one or more metrics and the third one or more metrics.

13. The system of claim 10, wherein the first one or more metrics comprise at least a transmission timestamp that indicates when the first TWAMP test packet was sent from the TWAMP session-sender executed on the first network device to the TWAMP session-reflector executed on the second network device, wherein the second one or more metrics comprise a first responder timestamp that indicates when the second TWAMP test packet was sent back to the TWAMP session-sender executed on the first network device from the TWAMP session-reflector executed on the second network device and a receive timestamp that indicates when the TWAMP session-reflector executed on the second network device received the first TWAMP test packet from the TWAMP session-sender executed on the first network device, and wherein the third one or more metrics comprise the at least one active round-trip network performance measurement for the link between the first network device and the second network device, wherein the at least one active round-trip network performance measurement is computed by the first network device based on the first one or more metrics and the second one or more metrics.

14. The system of claim 13, wherein, to compute at least one active round-trip network performance measurement for the link between the first network device and the second network device, the first network device is further configured to:
compute the at least one active round-trip network performance measurement based on the first one or more metrics and the second one or more metrics; and send, to the second network device, the at least one active round-trip network performance measurement as the third one or more metrics.

15. The system of claim 10, wherein the first one or more metrics comprise at least a transmission timestamp that indicates when the first TWAMP test packet was sent from the TWAMP session-sender executed on the first network device to the TWAMP session-reflector executed on the second network device;

wherein the second one or more metrics comprise at least a first delta compute time that indicates a time from when the TWAMP session-reflector executed on the second network device receives the first TWAMP test packet to a time when the TWAMP session-reflector executed on the second network device sends the second TWAMP test packet back to the TWAMP session-sender executed on the first network device;

wherein the third one or more metrics comprise at least a second delta compute time that indicates a time from when the TWAMP session-sender executed on the first network device receives the second TWAMP test packet to a time when the TWAMP session-reflector executed on the first network device sends the third TWAMP test packet back to the TWAMP session-sender executed on the second network device.

16. The system of claim 15, wherein, to compute at least one active round-trip network performance measurement for the link between the first network device and the second network device, the first network device is further configured to compute a first portion of the at least one active round-trip network performance measurement based on the second one or more metrics; and wherein, to compute at least one active round-trip network performance measurement for the link between the first network device and the second network device, the second network device is further configured to compute a second portion of the at least one active round-trip network performance measurement based on the third one or more metrics.

17. A non-transitory computer-readable medium comprising instructions for causing at least one programmable processor of a first network device comprising:

establish a TWAMP session between the first network device and a second network device, wherein the TWAMP session comprises a single test session between a TWAMP session-sender executed on the first network device and the TWAMP session-reflector executed on the second network device and between a TWAMP session-sender executed on the second network device and a TWAMP session-reflector executed on the first network device;

exchange, during the single test session between the TWAMP session-sender executed on the first network device and the TWAMP session-reflector executed on the second network device and between the TWAMP session-sender executed on the second network device and the TWAMP session-reflector executed on the first network device, a plurality of TWAMP test packets including one or more metrics; and compute, based on the one or more metrics of the plurality of TWAMP test packets, at least one active round-trip network performance measurement for a link between the first network device and the second network device.

18. The non-transitory computer-readable medium of claim 17, wherein the instructions further cause the at least one programmable processor of the first network device to:

send a first TWAMP test packet of the plurality of TWAMP test packets, the first TWAMP test packet including a first one or more metrics of the one or more metrics; and send, in response to receiving, from the TWAMP session reflector, a second TWAMP test packet of the plurality of TWAMP test packets from the TWAMP session reflector, a third TWAMP test packet of the plurality of TWAMP test packets back to the TWAMP session-reflector, the third TWAMP test packet including a third one or more metrics of the one or more metrics, wherein the second TWAMP test packet comprises a second one or more metrics of the one or more metrics.

19. The non-transitory computer-readable medium of claim 18, wherein the first one or more metrics comprise at least a transmission timestamp that indicates when the first TWAMP test packet was originally sent from the TWAMP session-sender executed on the first network device to the TWAMP session-reflector executed on the second network device, wherein the second one or more metrics comprise a first responder timestamp that indicates when the second TWAMP test packet was sent back to the TWAMP session-sender executed on the first network device from the TWAMP session-reflector executed on the second network device and a receive timestamp that indicates when the TWAMP session-reflector executed on the second network device received the first TWAMP test packet from the TWAMP session-sender executed on the first network device, and wherein the third one or more metrics comprise a second responder timestamp that indicates when the third TWAMP test packet was sent back to the TWAMP session-sender executed on the second network device from the TWAMP session-reflector executed on the first network device and a receive timestamp that indicates when the TWAMP session-reflector executed on the first network device received the second TWAMP test packet from the TWAMP session-reflector executed on the second network device.

20. The non-transitory computer-readable medium of claim 18, wherein the first one or more metrics comprise at least a transmission timestamp that indicates when the first TWAMP test packet was sent from the TWAMP session-sender executed on the first network device to the TWAMP session-reflector executed on the second network device, wherein the second one or more metrics comprise a first responder timestamp that indicates when the second TWAMP test packet was sent back to the TWAMP session-sender executed on the first network device from the TWAMP session-reflector executed on the second network device and a receive timestamp that indicates when the TWAMP session-reflector executed on the second network device received the first TWAMP test packet from the TWAMP session-sender executed on the first network device, and wherein the third one or more metrics comprise the at least one active round-trip network performance measurement for the link between the first network device and the second network device, wherein the at least one active round-trip network performance measurement is computed by the first network device based on the first one or more metrics and the second one or more metrics.

* * * * *